(12) United States Patent
Verschueren et al.

(10) Patent No.: US 7,397,597 B2
(45) Date of Patent: Jul. 8, 2008

(54) ELECTROPHORETIC DISPLAY PANEL

(75) Inventors: Alwin Rogier Martijn Verschueren, Eindhoven (NL); Peter Alexander Duine, Eindhoven (NL); Mark Thomas Johnson, Eindhoven (NL); Patrick John Baesjou, Eindhoven (NL); Lucas Josef Maria Schlangen, Eindhoven (NL); Eduard Matheus Johannes Niessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 10/599,007

(22) PCT Filed: Mar. 11, 2005

(86) PCT No.: PCT/IB2005/050880

§ 371 (c)(1),
(2), (4) Date: Sep. 18, 2006

(87) PCT Pub. No.: WO2005/093508

PCT Pub. Date: Oct. 6, 2005

(65) Prior Publication Data

US 2007/0206271 A1 Sep. 6, 2007

(30) Foreign Application Priority Data

Mar. 23, 2004  (EP) .................................. 04101187

(51) Int. Cl.
*G02B 26/00* (2006.01)
*G09G 3/34* (2006.01)
*G09G 5/10* (2006.01)
*G01N 27/00* (2006.01)
*G01N 27/26* (2006.01)

(52) U.S. Cl. ...................... 359/296; 345/107; 345/690; 204/600; 204/549; 430/32

(58) Field of Classification Search ................. 359/296, 359/452; 345/107, 141, 204, 345, 690; 204/155, 204/450, 516, 545, 549, 600, 616, 645; 430/19, 430/32, 34, 35, 38, 51; 324/71.1, 453
See application file for complete search history.

(56) References Cited

U.S. PATENT DOCUMENTS 4,258,316 A * 3/1981 Leif .......................... 324/71.1

(Continued)

FOREIGN PATENT DOCUMENTS

EP    1089118 A2    4/2001

(Continued)

OTHER PUBLICATIONS

ISR: PCT/IB05/050880.

(Continued)

*Primary Examiner*—Loha Ben

(57) ABSTRACT

An electrophoretic display panel for displaying a picture has a pixel having an electrophorectic medium having first and second charged particles, the first charged particles having a first optical property, the second charged particles having a second optical property different from the first optical property, and an optical state depending on positions of the particles. Furthermore, particle movement apparatus is arranged to enable a picture movement of the first and the second particles to their respective position for displaying the picture, and particles movement decoupling apparatus is arranged to provide unequal abilities of the first and the second particles to move for substantially decoupling the picture movement of the first particles from the picture movement of the second particles.

16 Claims, 9 Drawing Sheets

U.S. PATENT DOCUMENTS

| | | |
|---|---|---|
| 6,177,921 B1 | 1/2001 | Comiskey et al. |
| 6,580,545 B2 * | 6/2003 | Morrison et al. ............. 359/265 |
| 6,727,883 B2 * | 4/2004 | Uno et al. .................... 345/107 |
| 6,762,744 B2 * | 7/2004 | Katase ........................ 345/107 |
| 6,873,451 B2 * | 3/2005 | Ukigaya ...................... 359/296 |
| 7,038,655 B2 * | 5/2006 | Herb et al. ................... 345/107 |
| 7,180,649 B2 * | 2/2007 | Morrison et al. ............. 359/265 |
| 7,259,744 B2 * | 8/2007 | Arango et al. ............... 345/107 |
| 7,283,119 B2 * | 10/2007 | Kishi .......................... 345/107 |
| 2002/0180688 A1 | 12/2002 | Drazaic et al. |
| 2003/0231162 A1 | 12/2003 | Kishi |

FOREIGN PATENT DOCUMENTS

| | | |
|---|---|---|
| WO | 03079323 A1 | 9/2003 |
| WO | 2005088600 A2 | 9/2005 |

OTHER PUBLICATIONS

Written Opinion: PCT/IB05/050880.

* cited by examiner

ELECTROPHORETIC DISPLAY PANEL

The invention relates to an electrophoretic display panel for displaying a picture comprising
- a pixel having
  - an electrophoretic medium comprising first and second charged particles, the first charged particles having a first optical property, the second charged particles having a second optical property different from the first optical property, and
  - an optical state depending on positions of the particles,
- particle movement means arranged to enable a picture movement of the first and the second particles to their respective position for displaying the picture, and
- particles movement decoupling means arranged to provide unequal abilities of the first and the second particles to move for substantially decoupling the picture movement of the first particles from the picture movement of the second particles.

The invention also relates to a display device comprising such an electrophoretic display panel.

The invention further relates to a method of driving such an electrophoretic display panel.

An embodiment of the electrophoretic display panel of the type mentioned in the opening paragraph is disclosed in U.S. Pat. No. 6,177,921.

Electrophoretic display panels in general are based on the motion of charged, usually colored particles under the influence of an electric field between electrodes. With these display panels, dark or colored characters can be imaged on a light or colored background, and vice versa. Electrophoretic display panels are therefore notably used in display devices taking over the function of paper, referred to as "paper white" applications, e.g. electronic newspapers and electronic diaries.

The disclosed electrophoretic display panel is a color display panel. The pixel has a transparent electrode at the side facing the viewer, an electrode at the side facing away from the viewer, multiple species of charged particles in a clear, dispersing fluid between the electrodes. Each species of particles has a different optical property and possesses a different intrinsic electrophoretic mobility from the other species: e.g. red particles and blue particles, whereby the magnitude of the intrinsic electrophoretic mobility of the red particles, on average, exceeds the magnitude of the intrinsic electrophoretic mobility of the blue particles, on average. Due to the different intrinsic electrophoretic mobilities the red and blue particles have unequal abilities to move and the picture movement of the red particles is substantially decoupled from the picture movement of the blue particles. Consider the pixel to attain a red color for displaying the picture. The pixel having a red color results from the red particles being nearer to the electrode at the side facing the viewer than the blue particles. This result is achieved as follows. All the particles are attracted to the electrode at the side facing away from viewer by applying an electric field in the appropriate direction. The electric field should be applied to the pixel long enough to attract even the more slowly moving blue particles. Then the electric field is reversed just long enough to allow the red particles to migrate towards the electrode at the side facing the viewer. The blue particles will also move in the reversed electric field, but they will not move as fast as the red particles and thus will be obscured by the red particles. The amount of time for which the applied electric field must be reversed depends on the relative intrinsic electrophoretic mobilities of the particles and the strength of the applied electric field. If the pixel would have a blue color for displaying the picture the result is achieved as follows. The red and blue particles are attracted to the electrode at the side facing the viewer. Then the electric field is reversed and the red particles moving faster than the blue particles leave the blue particles exposed to the viewpoint. Therefore, the optical states attainable for the pixel for displaying the picture are red and blue. However, if the particles have substantially equal intrinsic electrophoretic mobilities, only one optical state, being the optical state determined by the mixture of the first and second particles, is attainable for the pixel for displaying the picture.

It is an object of the invention to provide a display panel of the kind mentioned in the opening paragraph which is able to have an attainable optical state for displaying the picture which is unequal to the optical state determined by the mixture of the first and the second particles, even if the particles have substantially equal intrinsic electrophoretic mobilities.

The object is thereby achieved that the particles movement decoupling means are arranged to provide unequal interactions of the first and the second particles with their respective surroundings for providing the unequal abilities of the first and the second particles to move.

The inventors have realized that the ability of the particles to move depends not solely on the intrinsic electrophoretic mobility. Therefore, for a given intrinsic electrophoretic mobility, the ability of the first and second particles to move can still be unequal, because of unequal interactions of the first and the second particles with their respective surroundings. In this way the picture movement of the first particles is substantially decoupled from the picture movement of the second particles. As a result it is achieved that the first and the second particles can independently be moved to their respective position for displaying the picture, even if the particles have substantially equal intrinsic electrophoretic mobilities. An optical state for displaying the picture being unequal to the optical state determined by the mixture of the first and the second particles is attainable then. Note that the picture movement of the first particles may be prior to, simultaneous with or subsequent to the second picture movement of the second particles and the unequal interactions may be present during a part of or the complete movement of the first and the second particles. The particles movement decoupling means are able to provide unequal freedoms of movement of the first and the second particles. The decoupling results from a restriction or extension in the freedom of movement of one of the particles. In an example, the particles movement decoupling means are able to provide unequal degrees of freedom of movement of the first and the second particles.

In an embodiment
- the particles movement decoupling means comprise first particles movement preventing means arranged to substantially prevent the first particles from moving during the picture movement of the second particles, and
- the particle movement means are further arranged
- to enable the picture movement of the first particles and subsequently
- to enable the picture movement of the second particles.

Then second particles movement preventing means may be absent. If, furthermore, the picture movement of the first particles is substantially parallel to the picture movement of the second particles, then the geometry of the panel is relatively simple.

In another embodiment
- the picture movement of the first particles is substantially along a first axis, the picture movement of the second particles is substantially along a second axis different from the first axis, and the particles movement decoupling means comprise first particles movement preventing means arranged to substantially prevent the first particles from moving substantially along the second axis during the picture movement of the second particles along the second axis, and second particles movement preventing means arranged to substantially prevent the second particles from moving substantially along the first axis during the picture movement of the first particles along the first axis.

Note that the movement of the first particles may be prior to, at least partly simultaneous with or subsequent to the movement of the second particles. If, furthermore, the first axis is substantially perpendicular to the second axis, the decoupling of the movement of the first and the second particles can relatively easy be achieved.

In another embodiment the first particles movement preventing means are provided with first physical boundaries in the medium extending substantially perpendicular to the second axis to substantially prevent the first particles from moving substantially along the second axis, and the second particles movement preventing means are provided with second physical boundaries in the medium extending substantially perpendicular to the first axis to substantially prevent the second particles from moving substantially along the first axis.

Then, the first and the second particles movement preventing means, e.g. barriers, are relatively simply implemented.

In another embodiment the second particles movement preventing means are provided in a portion of the pixel, and the particle movement means are further arranged to enable the second particles to occupy the portion of the pixel, subsequently to enable the picture movement of the first particles and subsequently to enable the picture movement of the second particles.

Then, the second particles movement preventing means are present only in a portion of the pixel, possibly outside the visible part and thereby not contributing to the optical state of the pixel. This may lead to higher brightness and contrast. Note that in this embodiment, the picture movement of the first particles is prior to the picture movement of the second particles. The first particles movement preventing means are relatively simply implemented, if, furthermore, the first particles movement preventing means are provided with first physical boundaries in the medium extending substantially perpendicular to the second axis to substantially prevent the first particles from moving substantially along the second axis.

In another embodiment the particle movement means are further arranged to enable a reset movement of the first particles along the first axis to a first reset position prior to the picture movement of the first particles, and to enable a reset movement of the second particles along the second axis to a second reset position prior to the picture movement of the second particles. Then, the accuracy of the picture is improved.

In another embodiment the particle movement means comprise first electrodes for receiving potentials to generate electric fields enabling the reset movement and/or the picture movement of the first particles, and second electrodes for receiving potentials to generate electric fields enabling the second reset movement and/or the picture movement of the second particles.

Then, the particles movement means are relatively simply implemented. If, furthermore, the first and the second electrodes have substantially flat surfaces facing the particles, and the substantially flat surfaces of the first electrodes are substantially perpendicular to the substantially flat surfaces of the second electrodes, the implementation of the particles movement means is further simplified.

In another embodiment the pixel has a viewing surface for being viewed by a viewer, the first and the second electrodes have substantially flat surfaces facing the viewer, and the surfaces are substantially parallel to the viewing surface. Then the geometry of the electrodes and the surfaces of the electrodes can relatively simply be manufactured. If, furthermore, the surfaces of the electrodes are present in a substantially flat plane, the manufacturing process of the electrodes is further simplified.

In another embodiment the electrophoretic medium further comprises third and fourth charged particles, the third charged particles having a third optical property, the fourth charged particles having a fourth optical property; the first, the second, the third and the fourth optical property being different from each other; the sign of the charge of the first and the second particles being equal and being opposite to the sign of the charge of the third and the fourth particles;

the optical state further depends on positions of the third and the fourth particles, the particle movement means are further arranged to enable a picture movement of the third and fourth particles to their respective position for displaying the picture, particles movement decoupling means arranged to provide unequal abilities of the particles to move for substantially decoupling the picture movement of the third particles from the picture movement of the fourth particles, and the particles movement decoupling means are arranged to provide unequal interactions of the particles with their respective surroundings for providing the unequal abilities of the particles to move.

In another embodiment, the display panel is an active matrix display panel.

Another aspect of the invention provides a display device comprising an electrophoretic display panel as claimed in one of the appended claims.

Yet another aspect of the invention provides a method of driving an electrophoretic display panel as claimed in one of the appended claims.

These and other aspects of the display panel of the invention will be further elucidated and described with reference to the drawings, in which.

In all the Figures corresponding parts are referenced to by the same reference numerals.

Figure 1:
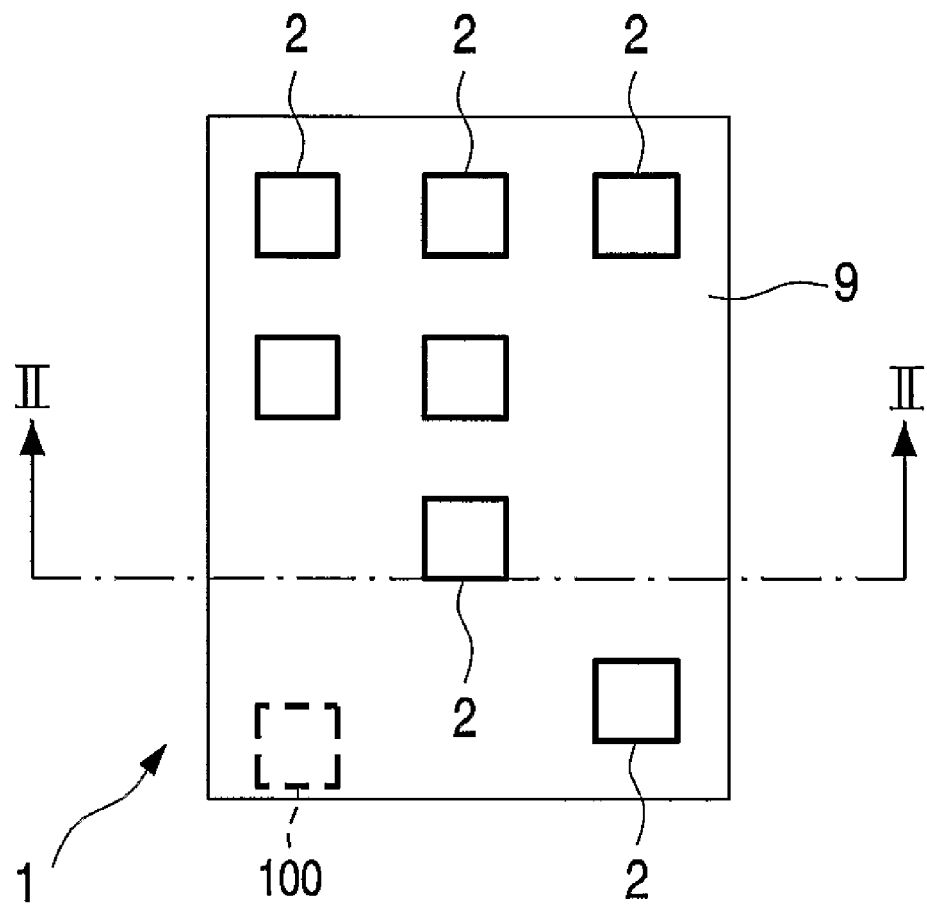
FIG. 1 shows diagrammatically a front view of an embodiment of the display panel.
Figure 2:
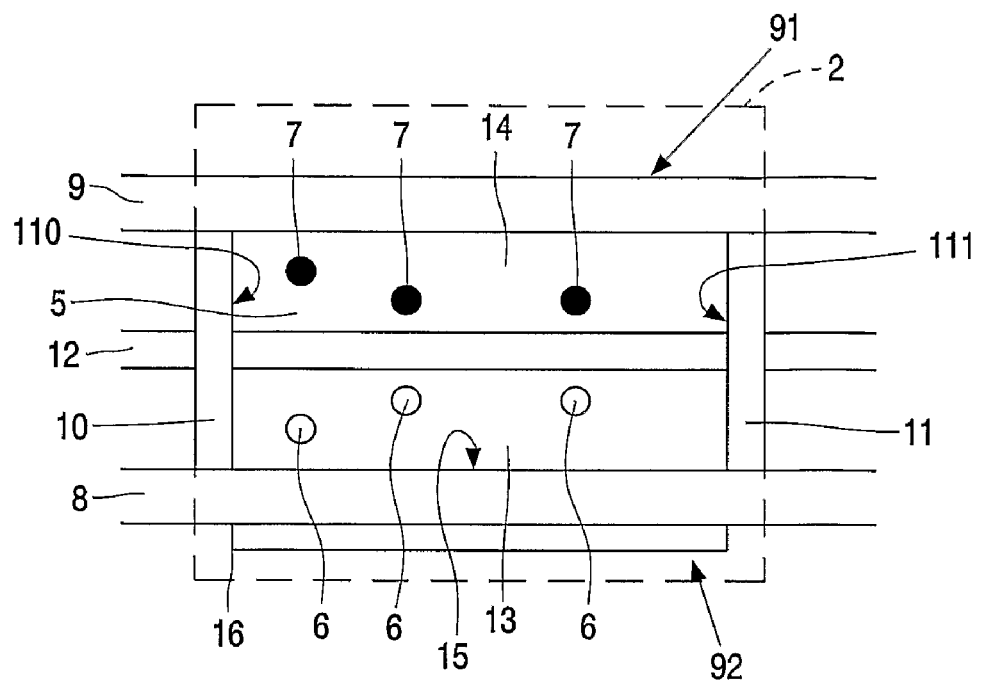
FIG. 2 shows diagrammatically a cross-sectional view along II-II in FIG. 1.
Figure 3:
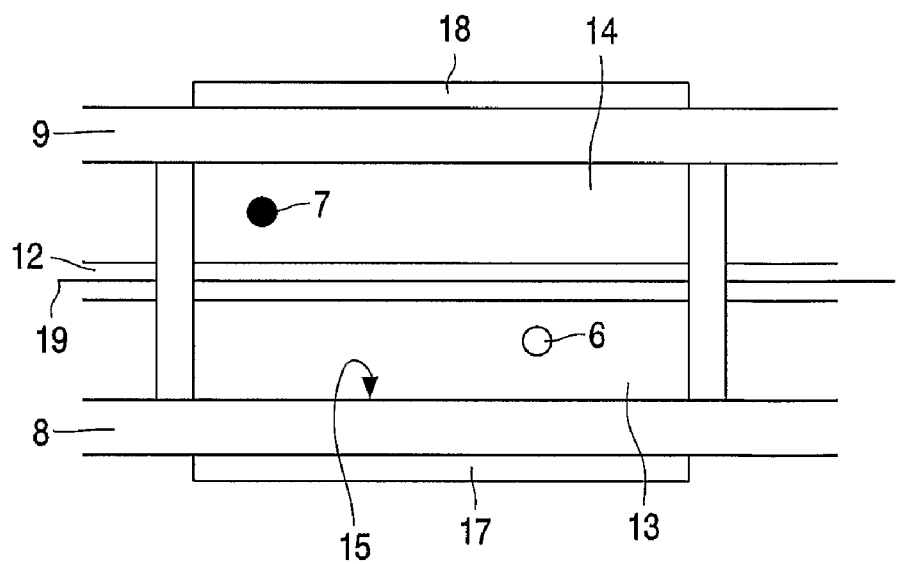
FIG. 3 shows diagrammatically a cross-sectional view along II-II in FIG. 1 of another embodiment of the display panel.
Figure 4:
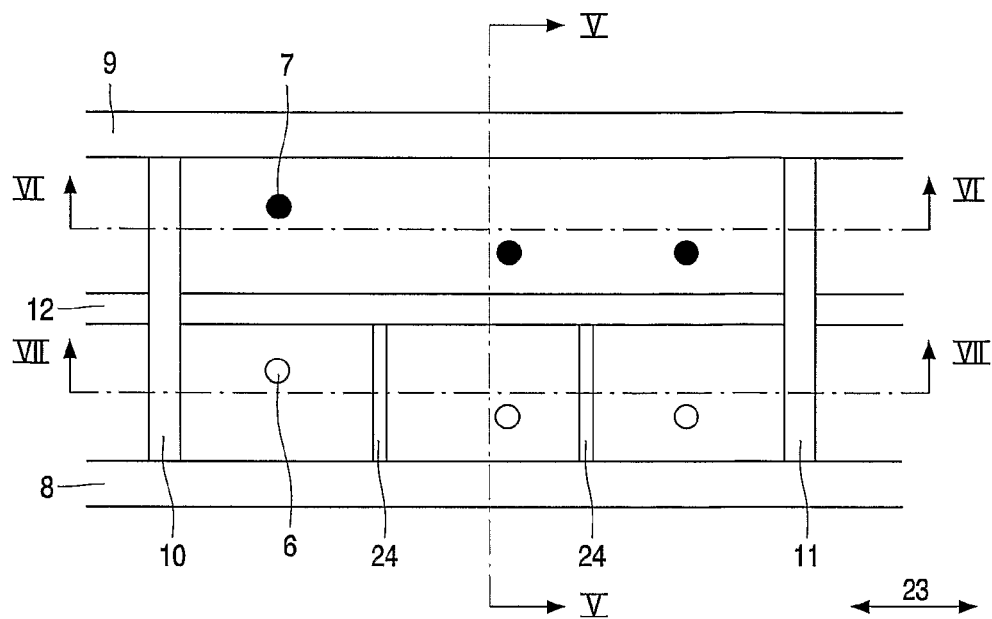
FIG. 4 shows diagrammatically a cross-sectional view along II-II in FIG. 1 of another embodiment of the display panel.
Figure 5:
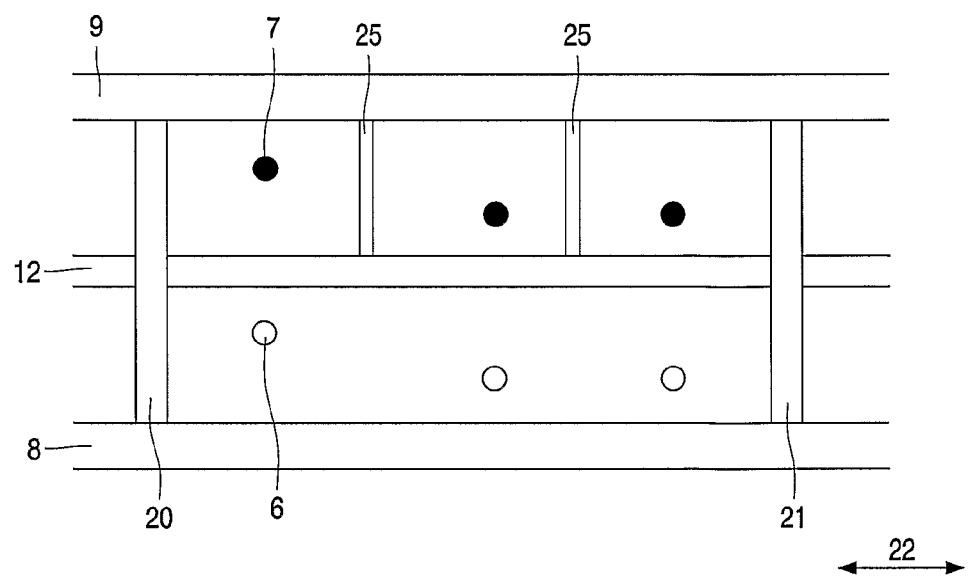
FIG. 5 shows diagrammatically a cross-sectional view along V-V in FIG. 4.
Figure 6:
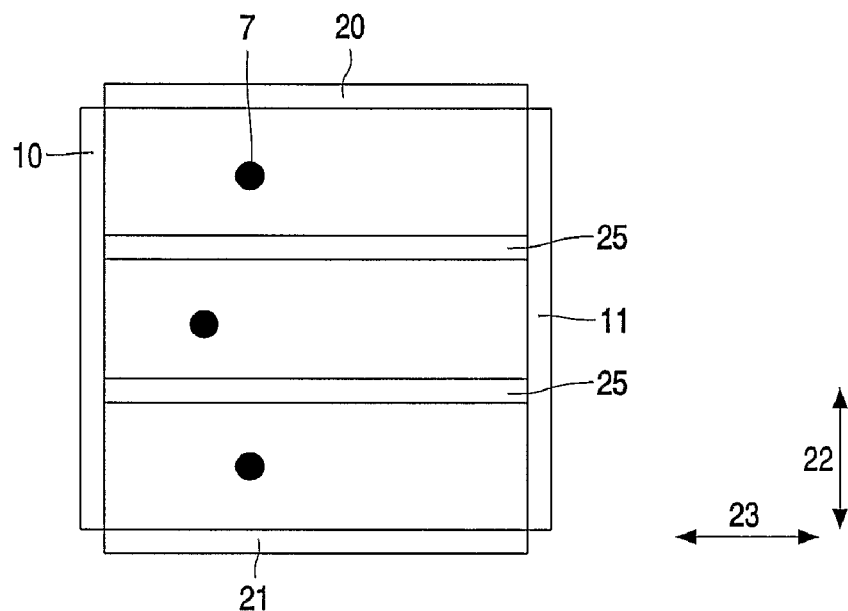
FIG. 6 shows diagrammatically a cross-sectional view along VI-VI in FIG. 4.
Figure 7:
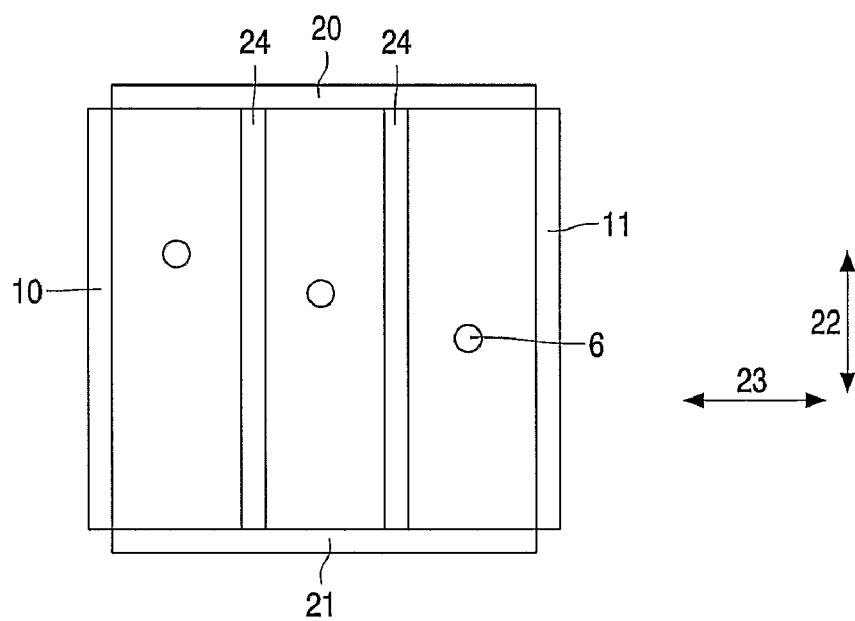
FIG. 7 shows diagrammatically a cross-sectional view along VII-VII in FIG. 4.
Figure 8:
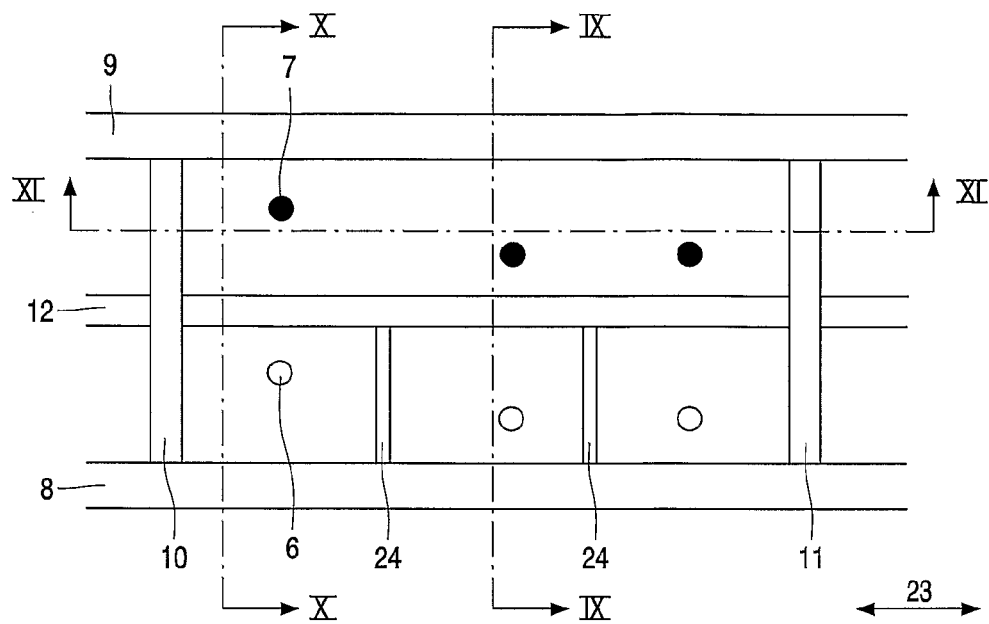
FIG. 8 shows diagrammatically a cross-sectional view along II-II in FIG. 1 of another embodiment of the display panel.
Figure 9:
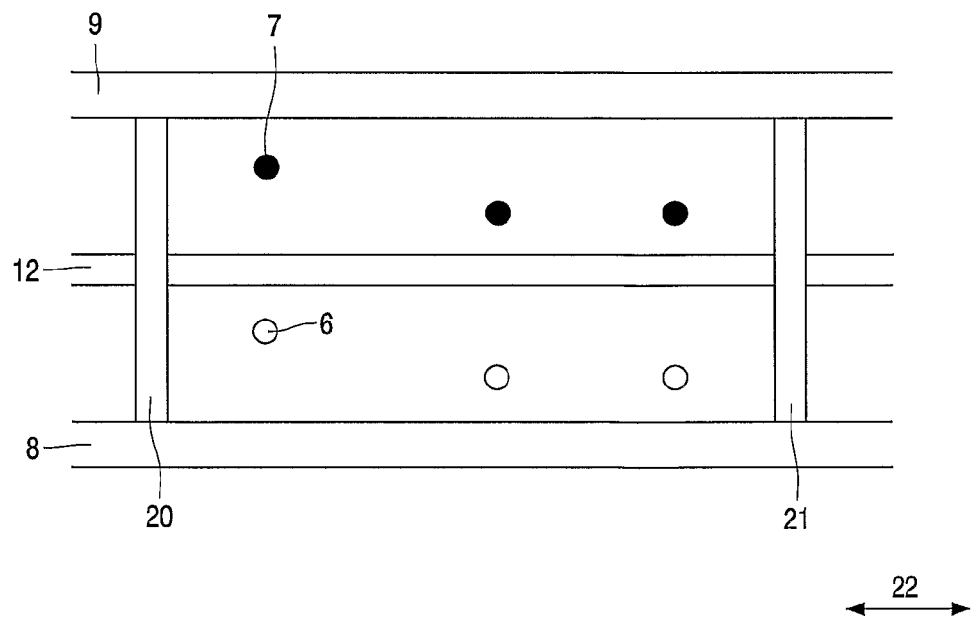
FIG. 9 shows diagrammatically a cross-sectional view along IX-IX in FIG. 8.
Figure 10:
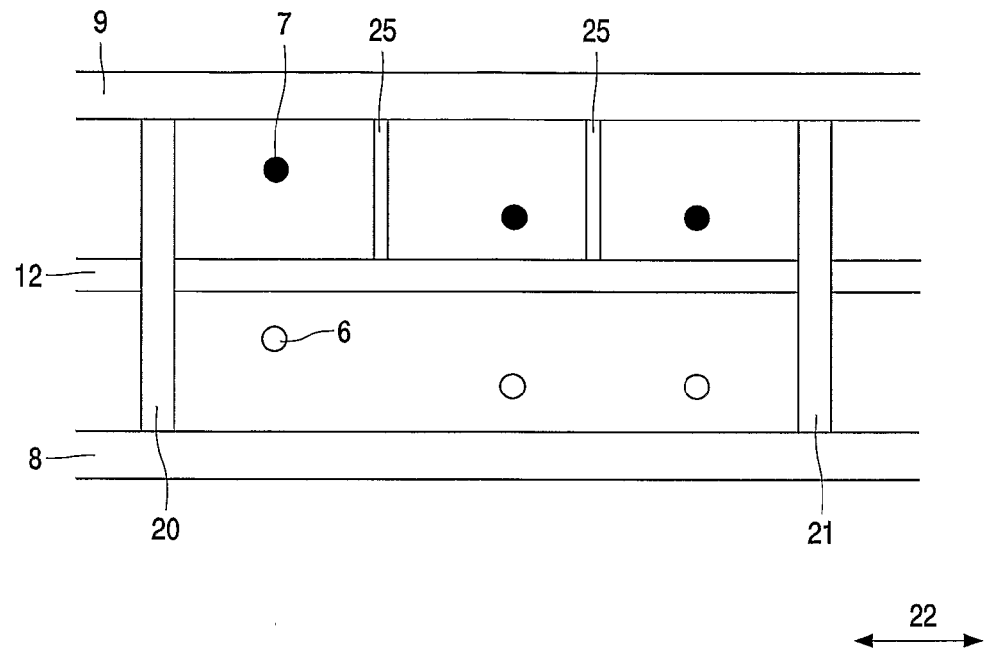
FIG. 10 shows diagrammatically a cross-sectional view along X-X in FIG. 8.
Figure 11:
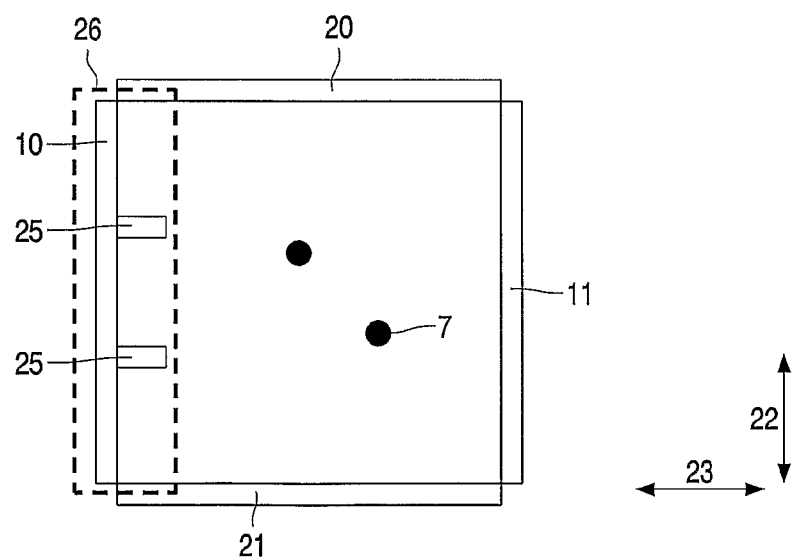
FIG. 11 shows diagrammatically a cross-sectional view along XI-XI in FIG. 8.

FIGS. 1, 2 and 3 show an example of the display panel 1 having a first substrate 8, a second transparent opposed substrate 9 and a plurality of pixels 2. Preferably, the pixels 2 are arranged along substantially straight lines in a two-dimensional structure. Other arrangements of the pixels 2 are alternatively possible, e.g. a honeycomb arrangement. In an active matrix embodiment, the pixels 2 may further comprise switching electronics, for example, thin film transistors (TFTs), diodes, MIM devices or the like.

An electrophoretic medium 5, having first charged particles 6 and second charged particles 7 in a transparant fluid, is present between the substrates 8,9. The surface 15 of the first substrate 8 facing the second substrate 9 may be reflective or have any color. Substrate 8 may even be transparent if the panel 1 is used in light transmissive mode. Electrophoretic media 5 are known per se from e.g. US 2002/0180688. The first charged particles 6 have a first optical property. The second charged particles 7 have a second optical property different from the first optical property. The first particles 6 may have any color, whereas the second particles 7 may have any color different from the color of the first particles 6. The first and second particles 6,7 may have subtractive primary colors, e.g. the first particles 6 being cyan and the second particles 7 being magenta. Other examples of the color of the first particles 6 are for instance red, green, blue, yellow, cyan, magenta, white or black. The particles may be large enough to scatter light, or small enough to substantially not scatter light. In the examples the latter is the case. The first particles 6 are able to occupy positions in the first cell 13 of the pixel 2, and the second particles 7 are able to occupy positions in the second cell 14 of the pixel 2. The first and the second cell 13,14 are vertically stacked and separated by a transparant layer or substrate 12. The pixel 2 has a viewing surface 91 for being viewed by a viewer. The optical state of a pixel 2 depends on the positions of the particles 6,7 in the pixel 2.

In transmissive mode, the optical state of the pixel 2 is determined by the portion of the visible spectrum incident on the pixel 2 at the side 92 of the first substrate 8 that survives the cumulative effect of traversing through the first substrate 8, cell 13, layer 12, cell 14 and the second substrate 9. In reflective mode, the optical state of the pixel 2 is determined by the portion of the visible spectrum incident on the pixel 2 at the side of the second substrate 9 that survives the cumulative effect of traversing through the second substrate 9, cell 14, layer 12, cell 13, subsequently interacting with surface 15 of the first substrate 8 which may be reflective or have any color and subsequently traversing back through cell 13, layer 12, cell 14 and the second substrate 9. In the examples the latter is the case. Furthermore, the amount and color of the light transmitted by each cell 13,14 is controlled by the position and the color of the particles 6,7 within the cell 13,14. When the particles are positioned in the path of the light that enters the cell, the particles absorb a selected portion of the light and the remaining light is transmitted through the cell. When the particles are substantially removed from the path of the light entering the cell, the light can pass through the cell and emerge without significant visible change. The light seen by the viewer, therefore, depends on the distribution of particles 6,7 in each of the cells 13,14 in the vertical stack.

The particle movement means 100 having electrodes 10,11 for receiving potentials are arranged to enable a picture movement of the first particles 6 to one of the positions for displaying the picture, and to enable a picture movement of the second particles 7 to one of the positions for displaying the picture. In this case, each one of the electrodes 10,11 has a substantially flat surface 110,111 facing the particles 6,7. As a result, a substantially homogeneous electric fields can be generated between the electrodes 10,11.

In an example, consider the first and the second particles 6,7 to be negatively charged and the first particles 6 to have a red color and the second particles 7 to have a green color. Furthermore, the surface 15 of the first substrate 8 is white. Furthermore, consider the pixel layout of FIG. 3 and the optical state of the pixel 2 for displaying the picture to be red. To obtain this optical state, firstly, the red particles 6 are brought in their distributed state in cell 13 by appropriately changing the potentials received by the electrodes 10,11. Subsequently, cooling means 16, e.g. a peltier element, cool the fluid in cell 13 thereby reducing the ability of the first particles 6 to move to substantially zero, as a result of a relatively large viscosity of the fluid at low temperatures. The fluid in cell 14 is substantially not cooled. Subsequently, by appropriately changing the potentials received by the electrodes 10,11 the green particles 7 are brought in their collected state near the surface of electrode 10 or 11, whereas during the second picture movement of the second particles 7, the first particles 6 are substantially immobile. As a result, the green particles 7 are substantially removed from the path of the light entering the cell and the light can pass through the cell without significant visible change. As, furthermore, the red particles 6 are present in the path of the light that enters the cell, the optical state of the pixel 2 is red.

Note that the pixel 2 has at least four achievable optical states: red, green, white and black. To obtain an optical state being green, firstly, the red particles 6 are brought in their collected state near the surface of electrode 10 or 11, by appropriately changing the potentials received by the electrodes 10,11. Subsequently, cooling means 16 cool the fluid in cell 13 thereby reducing the ability of the first particles 6 to move to substantially zero, as a result of the increased viscosity of the fluid at low temperatures. The fluid in cell 14 is substantially not cooled. Subsequently, the green particles 7 are brought in their distributed state in cell 14 by appropriately changing the potentials received by the electrodes 10,11.

To obtain an optical state being white, the red and green particles 6,7 are brought in their collected state near the surface of electrode 10 or 11 by appropriately changing the potentials received by the electrodes 10,11.

The optical state is black when both the red and the green particles 6,7 are in their distributed state in cell 13,14.

The ability of the first particles 6 to move during the second picture movement of the second particles 7 can be reduced to substantially zero in an alternative way, see the pixel layout of FIG. 3. Electrodes 17,18 and 19 are present at the surface of the first substrate 8, the surface of the second substrate 9 and in substrate 12. By applying appropriate potentials of e.g. 10, 0 and 0 Volts to electrodes 17,18,19 respectively, the first particles 6 can be brought in contact with the surface 15 of the first substrate 8 after the picture movement of the first particles 6. Furthermore, the first particles 6 subsequently remain stuck to the surface 15 of the first substrate 8 during the second picture movement of the second particles 7, whereas the second particles are influenced by the appropriate potentials applied to the electrodes 10,11.

The ability of the first particles 6 to move during the second picture movement of the second particles 7 can be reduced to substantially zero in a further alternative way, see the pixel layout of FIG. 3. Electrodes 17,18 and 19 are present at the surface of the first substrate 8, the surface of the second substrate 9 and in substrate 12. The application of appropriate shaking potentials, see European patent application 02077017.8 (in accordance to applicants docket referred to as PHNL020441) hereby incorporated by reference, to electrodes 18,19, causes an increase in ability to move of the second particles 7. The application of appropriate mobility decreasing potentials, see European patent application 04100804.6 (in accordance to applicants docket referred to as PHNL040195) hereby incorporated by reference, to electrodes 17,19, causes a decrease in ability to move of the first particles 6. As a consequence of the first particles 6 subsequently remain substantially immobile during the second picture movement of the second particles 7, whereas the second particles are influenced by the appropriate potentials applied to the electrodes 10,11. Electrodes 17,18,19 may be common electrodes provided for all pixels 2. In that case the number of drivers is relatively small. However, if electrodes 17 and 19 are separately addressed per pixel 2 then the picture update time is relatively small.

The examples referred to in FIGS. 2 and 3 show a picture movement of the first particles 6 being substantially parallel to the second picture movement of the second particles 7.

FIGS. 4-7 show a pixel 2 layout of another embodiment. In this embodiment the picture movement of the first particles 6 is substantially along a first axis 22 and the second picture movement of the second particles 7 is substantially along a second axis 23 different from the first axis. In this example the first axis 22 is substantially perpendicular to the second axis 23. The electrodes 10,11,20,21 have substantially flat surfaces facing the particles 6,7, and the substantially flat surfaces of the electrodes 10,11 are substantially perpendicular the substantially flat surfaces of the electrodes 20,21. The electric field resulting from potentials received by electrodes 10,11 points along the second axis 23, and the electric field resulting from potentials received by electrodes 20,21 points along the first axis 22. Furthermore, the first particles movement preventing means are provided with first physical boundaries 24 in the medium extending substantially perpendicular to the second axis 23 to substantially prevent the first particles 6 from moving substantially along the second axis 23, and the second particles movement preventing means are provided with second physical boundaries 25 in the medium extending substantially perpendicular to the first axis 22 to substantially prevent the second particles 7 from moving substantially along the first axis 22. The potentials received by the electrodes 10,11 only influence the position of the second particles 7, because the electric field resulting from the potentials received by electrodes 10,11 points along the second axis 23 and the physical boundaries 24 in the medium substantially prevent the first particles 6 from moving substantially along the second axis 23. Furthermore, the potentials received by the electrodes 20,21 only influence the position of the first particles 6, because the electric field resulting from the potentials received by electrodes 20,21 points along the first axis 22 and the physical boundaries 25 in the medium substantially prevent the second particles 7 from moving substantially along the first axis 22. In short: the first particles 6 are only sensitive for the potentials received by the electrodes 20,21 and the second particles 7 are only sensitive for the potentials received by the electrodes 10,11. An increase in the number of physical boundaries 24,25 increases the effectiveness of the movement preventing means. In this example, again, the first and the second particles 6,7 are negatively charged and red and green, respectively, and the surface 15 is white. Furthermore, consider the optical state of the pixel 2 for displaying the picture to be red. To obtain this optical state, the red particles 6 are brought in their distributed state in cell 13 by appropriately changing the potentials received by the electrodes 20,21, whereas the green particles 7 are brought in their collected state near the surface of electrodes 10 or 11, by appropriately changing the potentials received by the electrodes 10,11. Because of the selective sensitivity of the red and the green particles 6,7 for the potentials received by the electrodes 10,11,20,21, the movement of the red particles 6 is in time independent from the movement of the green particles 7, i.e. the movement of the red particles 6 may be prior to, at least partly simultaneous with or subsequent to the movement of the green particles 7.

Note that the pixel 2 has at least four achievable optical states: red, green, white and black. To obtain an optical state being green, the green particles 7 are brought in their distributed state in cell 14 by appropriately changing the potentials received by the electrodes 10,11, whereas the red particles 6 are brought in their collected state near the surface of electrode 20 or 21, by appropriately changing the potentials received by the electrodes 20,21. To obtain an optical state being white, the red and green particles 6,7 are brought in their collected state near the surface of electrode 20 or 21 and electrode 10 or 11, respectively, by appropriately changing the potentials received by the electrodes 10,11,20,21. The optical state is black when both the red and the green particles 6,7 are in their distributed state in cell 13,14. It is preferred that the physical boundaries 24,25 are substantially non-sticking, e.g. Teflon. Alternatively, the physical boundaries 24,25 may be provided by using an ordered anisotropic electrophoretic medium, for instance an aligned liquid crystal material. This anisotropy results in an increased ability to move in a preferential direction.

FIGS. 8-11 show a pixel 2 layout of another embodiment. This embodiment is similar to the previous embodiment shown in FIGS. 4-7. However, in this embodiment, the second particles movement preventing means are provided in a portion 26 of the pixel 2 near electrode 10, and the particle movement means are further arranged to enable the second particles to occupy the portion 26 of the pixel 2, subsequently to enable the picture movement of the first particles 6 and subsequently to enable the picture movement of the second particles 7. In this example, again, the first and the second particles 6,7 are negatively charged and red and green, respectively, and the surface 15 is white. Furthermore, consider the optical state of the pixel 2 for displaying the picture to be green. To obtain this optical state, the green particles 7 are brought in the portion 26 of the pixel 2 by appropriately changing the potentials received by the electrodes 10,11. Electrodes 20,21 have equal potentials not to disturb the movement of the green particles 7 to the portion 26 of the pixel 2. Subsequently, the red particles 6 are brought in their collected state in cell 13 by appropriately changing the potentials received by the electrodes 20,21. Electrodes 10,11 have appropriate potentials for preventing the green particles 7 from moving out of the portion 26 of the pixel 2. Furthermore, the potentials received by the electrodes 20,21 only influence the position of the red particles 6, because the electric field resulting from the potentials received by electrodes 20,21 points along the first axis 22 and the physical boundaries in the medium 25 substantially prevent the second particles 7 from moving substantially along the first axis 22. Subsequently, the green particles 7 are brought into their distributed state by appropriately changing the potentials received by the electrodes 10,11.

Note that the pixel 2 has at least four achievable optical states: red, green, white and black. To obtain an optical state being red, the green particles 7 are brought in their collected state and the red particles 6 are brought in their distributed state. To obtain an optical state being white, the red and green particles 6,7 are brought in their collected state near the surface of electrode 20 or 21 and electrode 10 or 11, respectively, by appropriately changing the potentials received by the electrodes 10,11,20,21. The optical state is black when both the red and the green particles 6,7 are in their distributed state in cell 13,14. In a limiting case, the portion 26 of the pixel 2 can be reduced to the surface of electrode. In that case the green particles 7 are kept substantially immobile by appropriate potentials on the electrodes.

In another embodiment, having a pixel 2 layout similar to the embodiment shown in FIGS. 4-7, the particle movement means are further arranged to enable a reset movement of the first particles 6 along the first axis 22 to a first reset position prior to the picture movement of the first particles 6, and to enable a reset movement of the second particles 7 along the second axis 23 to a second reset position prior to the picture movement of the second particles 7. Furthermore, consider the optical state of the pixel 2 for displaying the picture to be red. To obtain this optical state, the red particles 6 are brought to their reset position near the near the surface of electrode 20 or 21, by appropriately changing the potentials received by the electrodes 20,21. By resetting the red particles 6 their position is accurately defined. Subsequently, the red particles 6 are brought in their distributed state in cell 13 by appropriately changing the potentials received by the electrodes 20,21. Furthermore, independent from the movement of the red particles 6, the green particles 7 are brought to their reset position near the surface of electrode 10 or 11 by appropriately changing the potentials received by the electrodes 10,11. By resetting the green particles 7 their position is accurately defined. In this case the position of the green particles 7 in their collected state is substantially equal to the reset position of the green particles 7.

Figure 12:
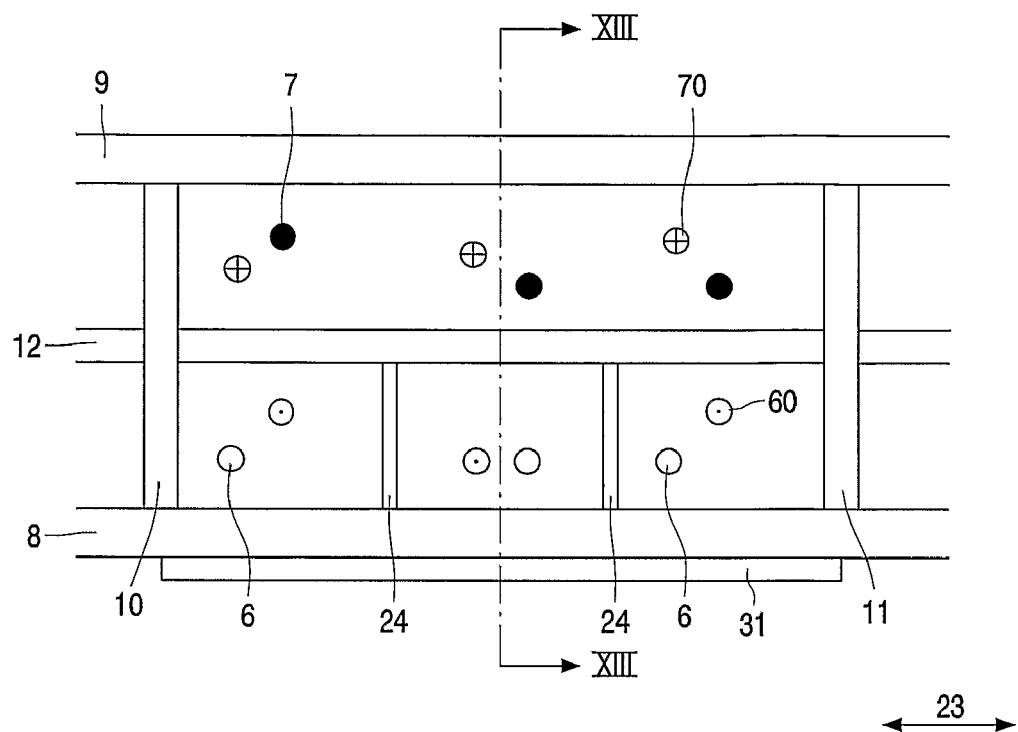
FIG. 12 shows diagrammatically a cross-sectional view along II-II in FIG. 1 of another embodiment of the display panel.
Figure 13:
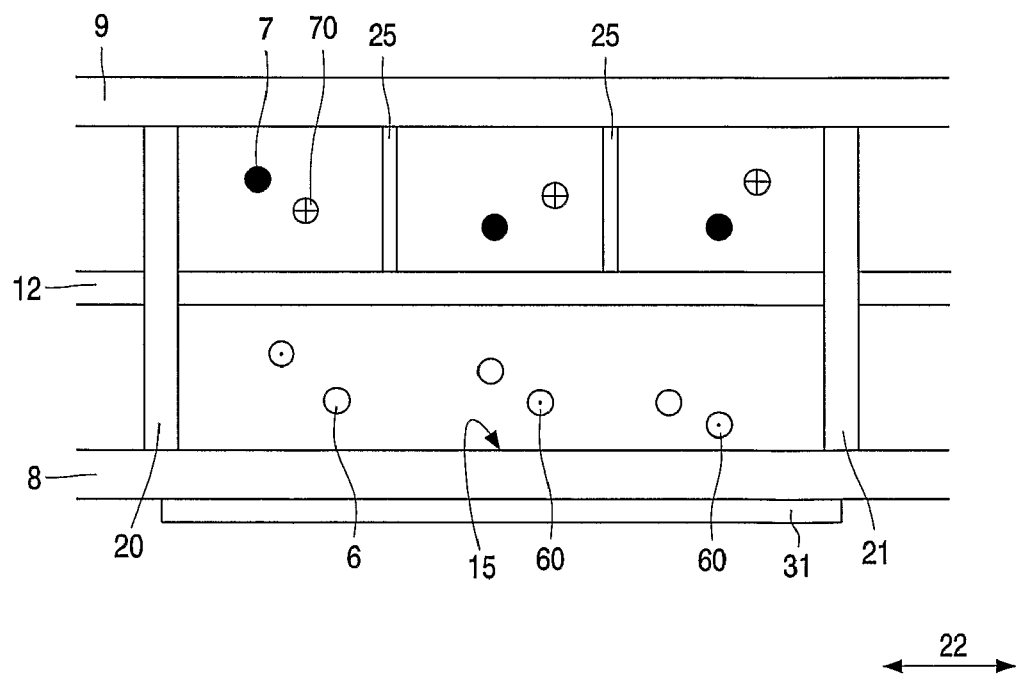
FIG. 13 shows diagrammatically a cross-sectional view along XIII-XIII in FIG. 12.

FIGS. 12 and 13 show a pixel 2 layout of another embodiment, similar to the embodiment shown in FIGS. 4-7. Here, again, the first and the second particles 6,7 are negatively charged and have colors red and green, respectively. The electrophoretic medium 5 further has third charged particles 60 being blue and fourth charged particles 70 being black. The blue and the black particles 60,70 are positively charged. The optical state further depends on positions of the third and the fourth particles 60,70. The surface 15 is white.

The picture movement of the first and the third particles 6,60 is substantially along a first axis 22 and the picture movement of the second and the fourth particles 7,70 is substantially along a second axis 23 different from the first axis 22. In this example the first axis 22 is substantially perpendicular to the second axis 23. The electrodes 10,11,20,21,31 have substantially flat surfaces facing the particles 6,7,60,70. The substantially flat surfaces of the electrodes 10,11 are substantially perpendicular the substantially flat surfaces of the electrodes 20,21. Furthermore, the surface of electrode 31 is substantially parallel to the viewing surface. The potential of electrode 31 is steady at 0 Volts. The electric field resulting from potentials received by electrodes 10,11 points along the second axis 23, and the electric field resulting from potentials received by electrodes 20,21 points along the first axis 22. Furthermore, the first and the third particles movement preventing means are provided with first physical boundaries 24 in the medium extending substantially perpendicular to the second axis 23 to substantially prevent the first and the third particles 6,60 from moving substantially along the second axis 23, and the second and fourth particles movement preventing means are provided with second physical boundaries 25 in the medium extending substantially perpendicular to the first axis 22 to substantially prevent the second and fourth particles 7,70 from moving substantially along the first axis 22. The potentials received by the electrodes 10,11 only influence the position of the second and the fourth particles 7,70, because the electric field resulting from the potentials received by electrodes 10,11 points along the second axis 23 and the physical boundaries 24 in the medium substantially prevent the first and the third particles 6,60 from moving substantially along the second axis 23. Furthermore, the potentials received by the electrodes 20,21 only influence the position of the first and the third particles 6,60, because the electric field resulting from the potentials received by electrodes 20,21 points along the first axis 22 and the physical boundaries 25 in the medium substantially prevent the second and the fourth particles 7,70 from moving substantially along the first axis 22. In short: the first and third particles 6,60 are only sensitive for the potentials received by the electrodes 20,21 and the second and fourth particles 7,70 are only sensitive for the potentials received by the electrodes 10,11. The first and the third particles 6,60 tend to move in opposite directions, as the sign of the charge of the first particles 6 is opposite to the sign of charge of the third particles 60. The second and the fourth particles 7,70 tend to move in opposite directions, as the sign of the charge of the second particles 7 is opposite to the sign of charge of the fourth particles 70.

Consider the optical state of the pixel 2 for displaying the picture to be white. To obtain this optical state, the red, green, blue and black particles 6,7,60,70 are brought in their collected state near the surface of electrodes 20,10,21,11, respectively, by appropriately changing the potentials, e.g. 10 Volts, 10 Volts, −10 Volts and −10 Volts, received by the electrodes 20,10,21,11.

To obtain an optical state being red, the optical state of the pixel 2 is changed to white as previously described. Subsequently, the potential received by electrode 20 is 0 Volts whereas the other electrodes 10,21,11, remain at their potentials of 10 Volts, −10 Volts and −10 Volts. As a consequence the red particles 6 diffuse along the first axis 22 into the pixel 2 and the other particles 7,60,70 remain in their collected state near the surface of electrodes 10,21,11, because of the potential barriers resulting from the potential of electrode 31 being 0 Volts and the potentials of the electrodes 10,21,11. As a result the optical state of the picture is red. If the potential barrier of the red particles 6 is not removed but only reduced by applying a potential of for instance 5 Volts to electrode 20 it is possible to make analogue grayscales in red.

An optical state being green, blue or black, or an analogue grayscale of green, blue or black, is obtained in a similar way by allowing the respective colored particles to diffuse into the pixel 2, while the other particles remain in their collected state. Each one of particles 6,7,60,70 can be moved into the pixel 2 independently from the other particles. Therefore, two or more of the particles 6,7,60,70 can be brought into the pixel 2, in a controlled way.

Furthermore, it is possible to speed up the diffusion of one of the particles 6,7,60,70 by applying (temporarily) an oppositely signed potential at the respective electrode. Then the displacement of the particles is not only clue to diffusion, but also migration.

In another embodiment, having a pixel 2 layout similar to the embodiment shown in FIGS. 12 and 13, the first, the second, the third and the fourth particles 6,7,60,70 have colors yellow, cyan, magenta and black, respectively. Then the pixel 2 can achieve at least the following favorable optical states: anyone of the three subtractive primary colors (yellow, cyan, magenta), anyone of the three primary colors (the optical state of the pixel is green when only the cyan and yellow particles are in the distributed state; the optical state of the pixel is blue when only the magenta and cyan particles are in the distributed state; the optical state of the pixel is red when only the magenta and yellow particles are in the distributed state), black and white.

Figure 14:
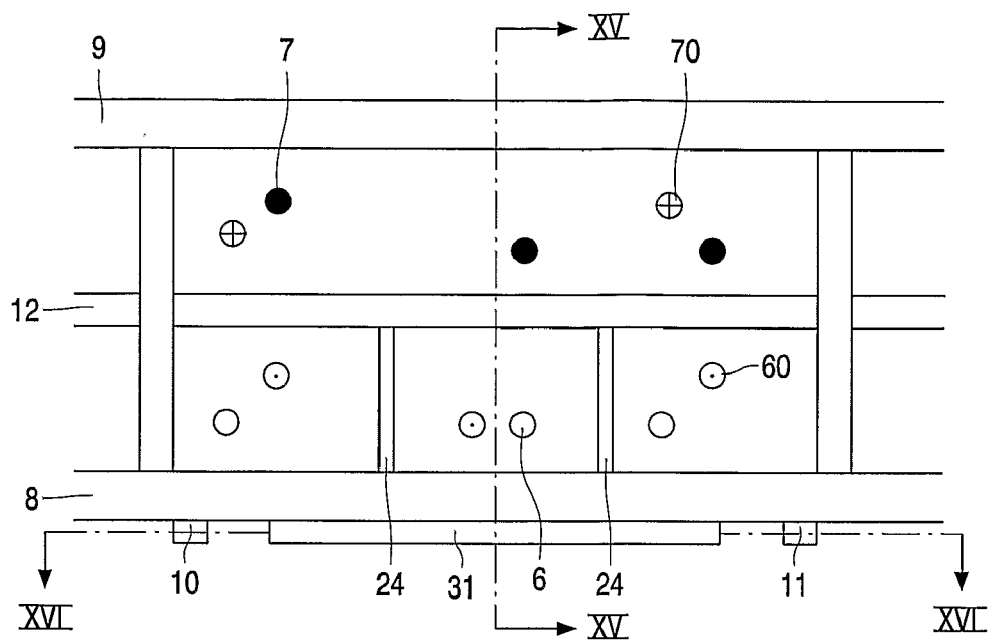
FIG. 14 shows diagrammatically a cross-sectional view along II-II in FIG. 1 of another embodiment of the display panel.
Figure 15:
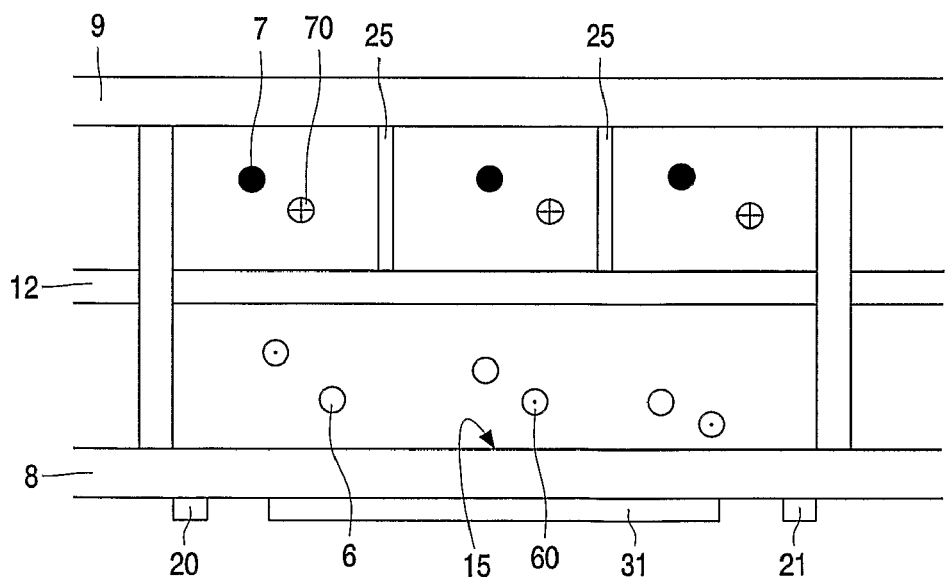
FIG. 15 shows diagrammatically a cross-sectional view along XV-XV in FIG. 14.
Figure 16:
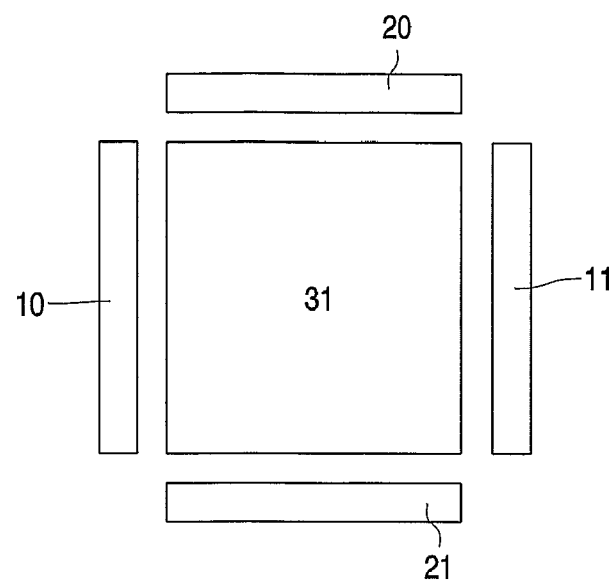
FIG. 16 shows diagrammatically a cross-sectional view along XVI-XVI in FIG. 14.

FIGS. 14-16 show a pixel 2 layout of another embodiment. Here the surfaces of the electrodes 10,11,20,21,31 are present in a substantially flat plane. This pixel 2 can relatively easy be manufactured.

Figure 17:
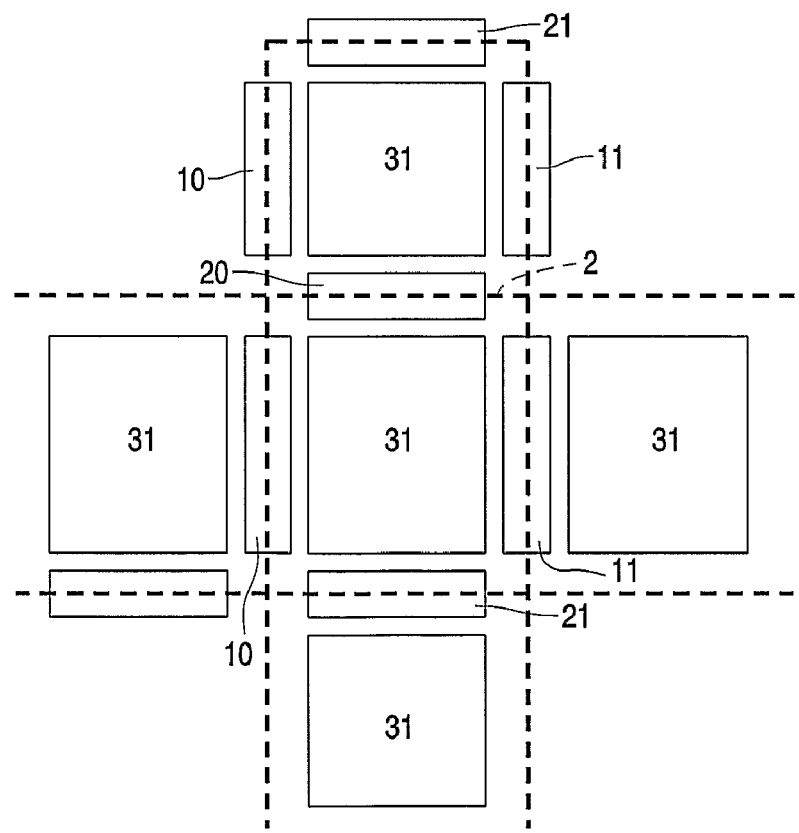
FIG. 17 shows an electrode configuration of another embodiment of the display panel.

FIG. 17 shows an alternative to the electrode configuration of FIG. 16. Here, each of the electrodes 10,11,20,21 are shared by two pixels 2. These pixels 2 can relatively easy be manufactured because of less electrodes and less transistors.

The electrodes 10,11,20,21,31 receive their respective potentials from the drive means 100.

The invention claimed is:

1. An electrophoretic display panel (1) for displaying a picture comprising:
    a pixel (2) having
        an electrophoretic medium (5) comprising first and second charged particles (6,7), the first charged particles (6) having a first optical property, the second charged particles (7) having a second optical property different from the first optical property, and
        an optical state depending on positions of the particles (6,7),
    particle movement means (10,11,100) arranged to enable a picture movement of the first and the second particles (6,7) to their respective position for displaying the picture, and
    particles movement decoupling means arranged to provide unequal abilities of the first and the second particles (6,7) to move for substantially decoupling the picture movement of the first particles (6) from the picture movement of the second particles (7),
characterized in that
the particles movement decoupling means (24,25) are arranged to provide unequal interactions of the first and the second particles (6,7) with their respective surroundings for providing the unequal abilities of the first and the second particles (6,7) to move.

2. A display panel as claimed in claim 1 characterized in that
    the particles movement decoupling means comprise first particles movement preventing means arranged to substantially prevent the first particles from moving during the picture movement of the second particles, and
    the particle movement means are further arranged
        to enable the picture movement of the first particles and subsequently
        to enable the picture movement of the second particles.

3. A display panel as claimed in claim 2 characterized in that the picture movement of the first particles is substantially parallel to the picture movement of the second particles.

4. A display panel as claimed in claim 1 characterized in that
    the picture movement of the first particles is substantially along a first axis,
    the picture movement of the second particles is substantially along a second axis different from the first axis, and
    the particles movement decoupling means comprise
        first particles movement preventing means arranged to substantially prevent the first particles from moving substantially along the second axis during the picture movement of the second particles along the second axis, and
        second particles movement preventing means arranged to substantially prevent the second particles from moving substantially along the first axis during the picture movement of the first particles along the first axis.

5. A display panel as claimed in claim 4 characterized in that the first axis is substantially perpendicular to the second axis.

6. A display panel as claimed in claim 5 characterized in that
    the first particles movement preventing means are provided with first physical boundaries in the medium extending substantially perpendicular to the second axis to substantially prevent the first particles from moving substantially along the second axis, and
    the second particles movement preventing means are provided with second physical boundaries in the medium extending substantially perpendicular to the first axis to substantially prevent the second particles from moving substantially along the first axis.

7. A display panel as claimed in claim 4 characterized in that the second particles movement preventing means are provided in a portion of the pixel, and the particle movement means are further arranged
    to enable the second particles to occupy the portion of the pixel, subsequently
    to enable the picture movement of the first particles and subsequently
    to enable the picture movement of the second particles.

8. A display panel as claimed in claim 7 characterized in that the first particles movement preventing means are provided with first physical boundaries in the medium extending substantially perpendicular to the second axis to substantially prevent the first particles from moving substantially along the second axis.

9. A display panel as claimed in claim 4 characterized in that the particle movement means are further arranged to enable a reset movement of the first particles along the first axis to a first reset position prior to the picture movement of the first particles, and to enable a reset movement of the second particles along the second axis to a second reset position prior to the picture movement of the second particles.

10. A display panel as claimed in claim 9 characterized in that the particle movement means comprise first electrodes for receiving potentials to generate electric fields enabling the reset movement and/or the picture movement of the first particles, and second electrodes for receiving potentials to generate electric fields enabling the reset movement and/or the picture movement of the second particles.

11. A display panel as claimed in claim 10 characterized in that the first and the second electrodes have substantially flat surfaces facing the particles, and the substantially flat surfaces of the first electrodes are substantially perpendicular to the substantially flat surfaces of the second electrodes.

12. A display panel as claimed in claim 10 characterized in that the pixel has a viewing surface for being viewed by a viewer, the first and the second electrodes have substantially flat surfaces facing the viewer, and the surfaces are substantially parallel to the viewing surface.

13. A display panel as claimed in claim 12 characterized in that the surfaces of the electrodes are present in a substantially flat plane.

14. A display panel as claimed in claim 1 characterized in that the electrophoretic medium further comprises third and fourth charged particles, the third charged particles having a third optical property, the fourth charged particles having a fourth optical property; the first, the second, the third and the fourth optical property being different from each other; the sign of the charge of the first and the second particles being equal and being opposite to the sign of the charge of the third and the fourth particles;

the optical state further depends on positions of the third and the fourth particles, the particle movement means are further arranged to enable a picture movement of the third and fourth particles to their respective position for displaying the picture, particles movement decoupling means arranged to provide unequal abilities of the particles to move for substantially decoupling the picture movement of the third particles from the picture movement of the fourth particles, and the particles movement decoupling means are arranged to provide unequal interactions of the particles with their respective surroundings for providing the unequal abilities of the particles to move.

15. A display device comprising the display panel as claimed in claim 1.

16. Method of driving an electrophoretic display panel for displaying a picture, the electrophoretic display panel comprising:

a pixel having an electrophoretic medium comprising first and second charged particles, the first charged particles having a first optical property, the second charged particles having a second optical property different from the first optical property, and an optical state depending on positions of the particles, particle movement means, and particles movement decoupling means, the method comprising providing a picture movement of the first and the second particles to their respective position for displaying the picture, and providing unequal interactions of the first and the second particles with their respective surroundings for providing unequal abilities of the first and the second particles to move for substantially decoupling the picture movement of the first particles from the picture movement of the second particles.

* * * * *